Jan. 23, 1968   G. D. KENNEDY   3,364,609
LINE HOLDER FOR SPEAR GUNS
Filed Oct. 4, 1965   2 Sheets-Sheet 1
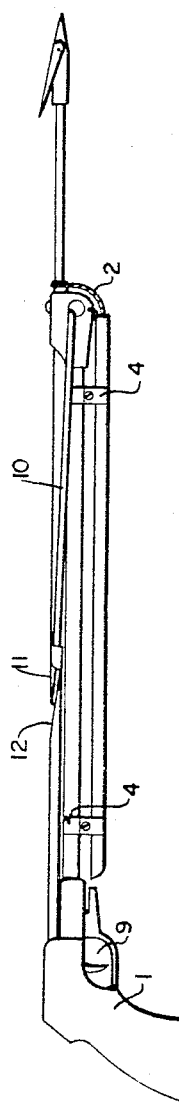
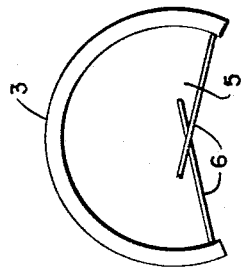
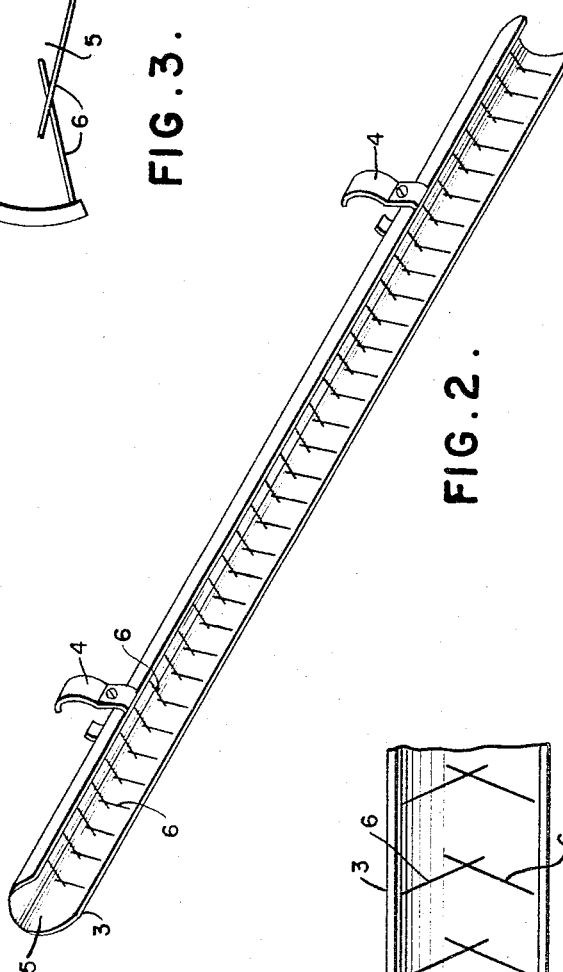
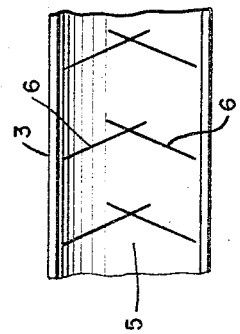
INVENTOR
George D. Kennedy
BY *George M. Anderson*
ATTORNEY Jan. 23, 1968     G. D. KENNEDY     3,364,609

LINE HOLDER FOR SPEAR GUNS

Filed Oct. 4, 1965     2 Sheets-Sheet 2

INVENTOR

George D. Kennedy

BY    *George M. Anderson*

ATTORNEY

United States Patent Office 3,364,609
Patented Jan. 23, 1968

3,364,609
LINE HOLDER FOR SPEAR GUNS
George Denton Kennedy, Pine Hill, Ala. (321 Ocean
View Blvd., Vandenberg A.F.B., Calif. 93437)
Filed Oct. 4, 1965, Ser. No. 492,369
3 Claims. (Cl. 43—6)

The invention relates to spear guns for use in spearing fish wherein a line is attached at one end to the gun and at the other end to the spear for retrieving the spear after the gun has been fired. Various means are used for holding and retaining the line in orderly fashion when the gun is not in use. One way being used is to bring the line back from both ends forming a double or looped line, the loop being slipped into a slit provided at the fore part of the trigger guard to hold the line parallel to and just below the gun barrel.

Another common method used, especially with a more powerful gun that allows for the use of a much longer line, is to coil the line and hold it in a manner that the line will uncoil when the spear is projected from the gun. The first method is not satisfactory because the line, after a period of time, becomes slack and often falls loose while maneuvering under water, or probing with the gun spear, the line becomes tangled. The second method is not only dangerous if not performed expertly, it also prevents the free use of one hand which is a great handicap while driving.

An object of this invention is to provide a means for laying a line within a line holder that will prevent the line from becoming entangled while not in use.

Another object of this invention is to provide a line holder that will practically eliminate the danger of a person becoming entangled in the line when it is propelled from the line holder.

Another object of this invention is to provide a line holder that will keep the line sufficiently taut for maintaining the line in an out-of-the-way position and release the line without hindering the line from free flight when projected from a propelling apparatus.

The invention consists in the novel construction and combinations of parts hereinafter set forth in the claims.

Figure 6:
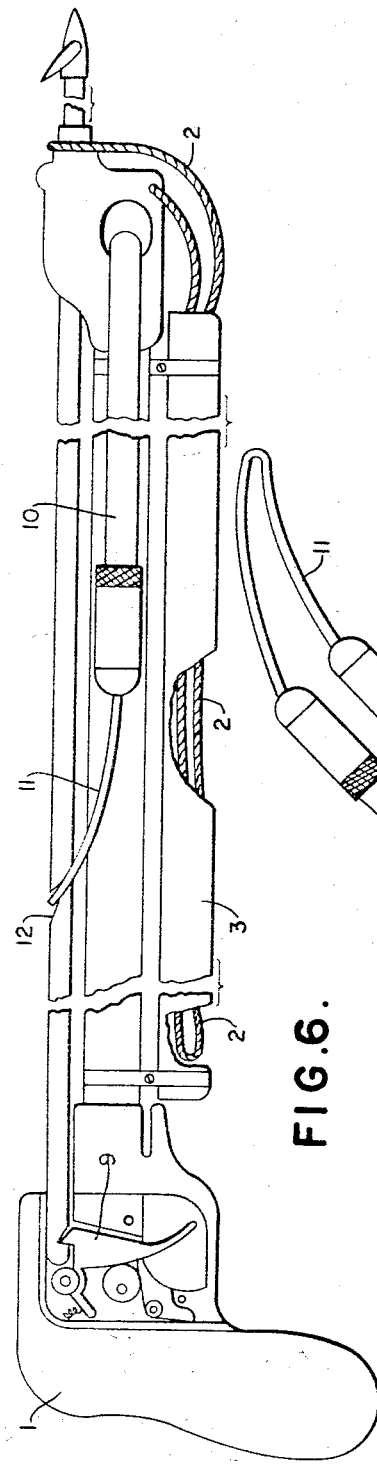
Figure 5:
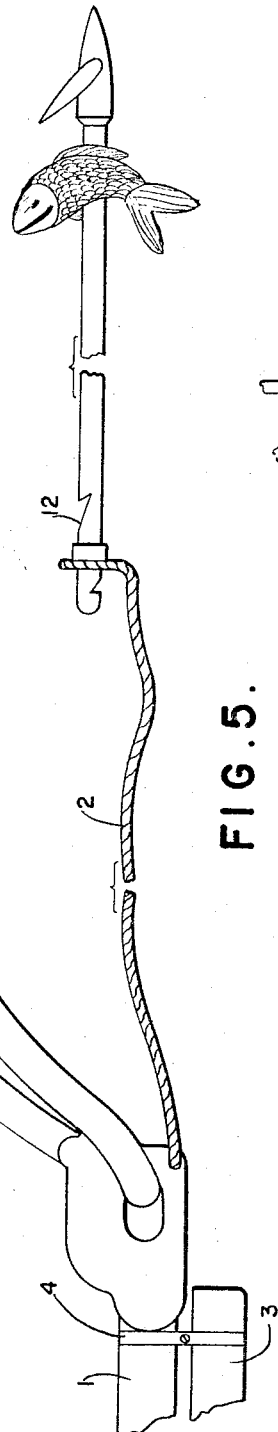
Figure 7:
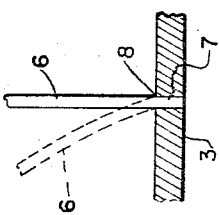

In the accompanying drawings:
FIGURE 1 is a side view of the spear gun having the invention applied thereto.
FIGURE 2 is a perspective view of the invention.
FIGURE 3 is an end view of the duct showing the pins in position.
FIGURE 4 is a fragmentary bottom plan view of the duct.
FIGURE 5 is a side view of the forward end portion of the line holding duct, showing parts of the gun after it is fired.
FIGURE 6 is a side view partly broken away of the line holding duct as applied.
FIGURE 7 is a fragmentary detail view of one of the line retaining pins showing its root end rigidly secured within a perforation in the duct wall.

Referring to the drawings, the numeral 1 designates the spear gun, and 2 the line attached at one end to the gun and at the other end to the spear for retrieving the spear after the gun has been fired.

The gun is provided with means for holding the line 2 in orderly condition when the gun is not in use, said means comprising a line holding duct 3 which is clamped to the gun barrel just below the same by clamps 4, said duct being approximately the same length as that of the gun barrel and open at the bottom at 5 throughout its length, and open at both ends.

Said means further comprise a plurality of slender flexible pins 6 rigidly secured at their root ends within perforations 7 in the duct wall and normally closing the open bottom of said duct and bendable at their root ends at 8 to admit the line into said duct and through inherent resiliency bendable back to normal position to retain the line in the duct. Said pins extend from opposite sides of the duct towards and lap one another in couples throughout the length of the duct and are bendable to admit the line between them when the line is pressed by hand against them.

After the gun has been fired, the two end portions of the doubled line are picked up by the fisherman and the line carried rearwardly towards the butt end of the gun, using the line holder duct as a guide or track, simultaneously pressing the doubled line past the pins 6 which yield for said passage and spring back to line retaining position.

When the trigger is in its FIGURE 6 position the spear is held under the tension of the elastic rubber cord 10 the ends of which are connected by a string 11 engaging a notch 12 of the spear to hold said tension and from which it is released when said trigger is pressed to fire the gun.

The right is reserved to modifications and to any other uses of which the invention may be capable coming within the scope of the claims.

I claim:
1. A spear gun having means for projecting a spear therefrom, and a line attached at one end to the gun and at the other end to the spear for retrieving the spear after the gun has been fired, characterized in that the gun is provided with a line holding duct for holding the line in orderly fashion when the gun is not in use and through which the line passes when the gun is fired, said duct being open at the bottom throughout its length and having resilient means normally closing said open bottom of said duct but yieldable to admit the line when pressed by hand into the duct through said open bottom and capable of springing back to normal position to retain the line in the duct.

2. A spear gun as defined in claim 1, in which said resilient means comprises a plurality of slender pins rigidly connected at their root ends within perforations in the duct wall throughout the length of the duct, pairs of said pins extending towards each other from opposite sides of the duct and being capable of being separated from each other by the line when it is pressed by hand therein and of springing back to normal position to retain the line in the duct.

3. A spear gun as defined in claim 2, in which said pins are bendable to admit the line into the duct when the line is pressed by hand against the pins and through inherent elasticity bendable automatically back to normal position to retain the line within the duct.

References Cited
UNITED STATES PATENTS

| | | | |
|---|---|---|---|
| 2,888,768 | 6/1959 | Taylor | 43—6 X |
| 3,016,891 | 1/1962 | Ebeling | 43—6 X |
| 3,102,525 | 9/1963 | Englis | 43—6 X |

SAMUEL KOREN, *Primary Examiner.*

W. H. CAMP, *Assistant Examiner.*